United States Patent
Kaiser et al.

[11] Patent Number: 6,167,236
[45] Date of Patent: Dec. 26, 2000

[54] DAMPING MODULATION CIRCUIT FOR A FULL-DUPLEX TRANSPONDER

[75] Inventors: Ulrich Kaiser, Warstein; Wolfgang Steinhagen, Mauern, both of Germany

[73] Assignee: Texas Instruments Deutschland, GmbH, Freising, Germany

[21] Appl. No.: 08/791,208

[22] Filed: Jan. 31, 1997

Related U.S. Application Data

[60] Provisional application No. 60/010,943, Jan. 31, 1996.

[51] Int. Cl.[7] ................................................. H04B 5/00
[52] U.S. Cl. ............................... 455/41; 455/42; 342/51; 340/505
[58] Field of Search ............................ 455/42, 205, 206, 455/210, 211, 214, 41; 340/825.54, 505; 342/44, 42, 51; 332/117, 123

[56] References Cited

U.S. PATENT DOCUMENTS

| | | | |
|---|---|---|---|
| 3,299,424 | 1/1967 | Vinding | 455/41 |
| 3,689,885 | 9/1972 | Kaplan et al. | 455/41 |
| 3,752,960 | 8/1973 | Walton | 235/61.11 |
| 3,859,624 | 1/1975 | Kriofsky et al. | 340/152 |
| 3,898,619 | 8/1975 | Carsten et al. | 340/152 |
| 4,333,072 | 6/1982 | Beigel . | |
| 4,453,121 | 6/1984 | Noufer | 323/226 |
| 4,730,188 | 3/1988 | Milheiser | 340/825 |
| 4,963,887 | 10/1990 | Kawashima et al. | 342/44 |
| 5,041,826 | 8/1991 | Milheiser | 340/825.54 |
| 5,410,315 | 4/1995 | Huber | 342/42 |
| 5,541,604 | 7/1996 | Meier | 342/42 |
| 5,870,031 | 2/1999 | Kaiser et al. | 340/825.54 |

FOREIGN PATENT DOCUMENTS

| | | | |
|---|---|---|---|
| 34 00 973 | 1/1984 | Germany | H02H 7/125 |
| WO 88 03594 | 8/1988 | WIPO | E05B 49/00 |

*Primary Examiner*—Edward F. Urban
*Attorney, Agent, or Firm*—Rebecca Mapstone Lake; Frederick J. Telecky, Jr.

[57] ABSTRACT

An improved damping modulation circuit (140) for a transponder (14) receives energy transmitted from a transmitter/receiver antenna (16) to produce a unique recognition signal in the transponder. The improved damping modulation circuit (140) includes a high fieldstrength circuit (152, 160, 174) that protects full-duplex transponder (14) from overvoltage through the use of voltage limiters (132), while still providing power to transponder (14). Low fieldstrength circuit (152) activates only minimal circuitry to provide the highest possible amount of power to full-duplex transponder (14). Medium fieldstrength circuit (152, 160) increases the fieldstrength in full-duplex transponder (14) for establishing a sufficient amount of current flow for proper modulation using only a medium amount of transponder (14) circuit elements.

20 Claims, 4 Drawing Sheets

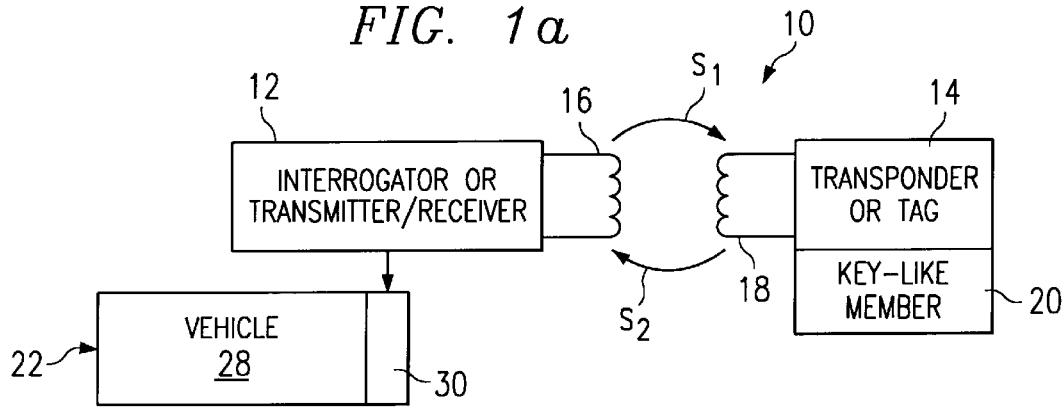
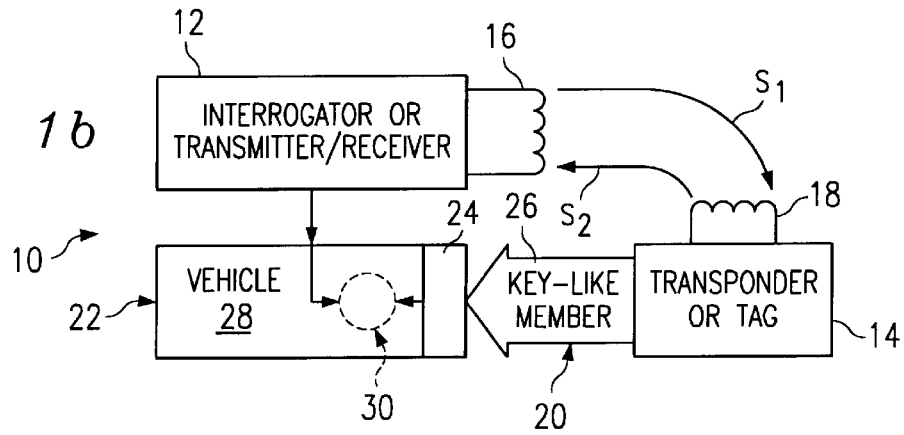
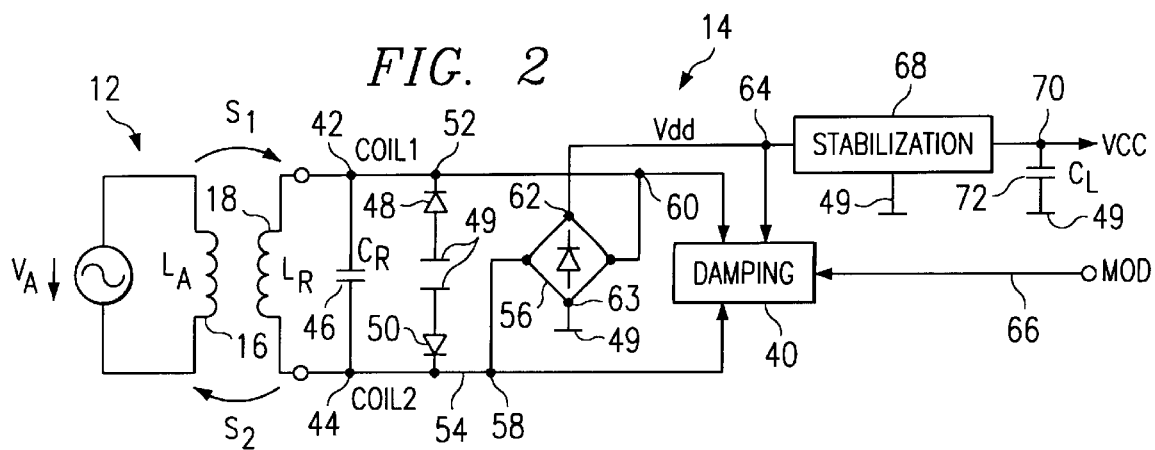

DAMPING MODULATION CIRCUIT FOR A FULL-DUPLEX TRANSPONDER

This application claims benefit of Provisional Application 60/010,943, filed Jan. 31, 1996.

TECHNICAL FIELD OF THE INVENTION

The present invention relates to an improved damping modulation circuit for a recognition system, and, more particularly, to an improved damping modulation circuit for a recognition system, which system is usable in conjunction with an ignition switch or similar control mechanism for a vehicle or other facility, and which damping modulation circuit operates effectively under different fieldstrength conditions in a full-duplex transponder to increase the ability of the recognition system to recognize and respond to a key, or similar item, which "matches" the ignition system or other control mechanism.

BACKGROUND OF THE INVENTION

Various types of recognition systems are taught by the following commonly assigned U.S. patents and applications: U.S. Pat. Nos. 5,287,112; 5,270,717; 5,196,735; 5,170,493; 5,168,282; 5,126,745; 5,073,781; 5,053,774; 5,025,492; U.S. Ser. No. 08/021,123, filed Feb. 23, 1993 [TI-17529], now U.S. Pat. No. 5,701,127; Ser. No. 08/065,286, filed May 21, 1993 [TI-16981], now abandoned; and Ser. No. 08/086,786, filed Jul. 2, 1993 [TI-17507], U.S. Pat. No. 5,347,280. Systems conforming to the teachings of the foregoing documents are marketed under the name TIRIS ("Texas Instruments Register and Identification System"). A recognition system similar in result to, but structurally and functionally specifically different from, TIRIS is disclosed in U.S. Pat. No. 4,918,955. Other types of recognition systems include systems known as AVI (for "Automatic Vehicular Identification"), as taught, for example, by commonly assigned U.S. Pat. No. 5,287,112 and commonly assigned U.S. application Ser. No. 08/021,123, filed Feb. 23, 1993.

In one type of TIRIS recognition system of interest, a transmitter/receiver (also referred to herein, in the claims hereof and elsewhere as an "interrogator" or a "reader") selectively radiates energy via an associated first antenna. The energy is radiated from the vicinity of a key-operated lock, such as a vehicle ignition switch. The radiated energy is often referred to as an "interrogation signal." The radiated energy is received by a second antenna present on or in a key. The key also includes facilities, such as circuitry (sometimes called a "transponder" or "tag"), connected to the second antenna. An electrical signal produced or induced in the key's circuitry by the received energy either is affected (e.g., increased or decreased) by the circuitry or effects the generation of a stored, uniquely-coded signal by the circuitry. The affected or coded signal is often referred to as a "recognition signal."

Depending on the constituents of the key circuitry, either the recognition signal is transmitted or reflected back to the transmitter/receiver via the second and first inductors or antennas. A key "matching" the particular ignition switch transmits or causes a predetermined recognition signal. Other keys which operate other ignition switches associated with similar recognition systems may similarly respond to the interrogation signal but transmit recognition signals different from the predetermined recognition signal.

The transmitter/receiver includes facilities which analyze the recognition signals received thereat to determine if the analyzed signal is the predetermined recognition signal produced by the matching key. If the analyzed signal is the predetermined recognition signal, the concurrence of such predetermined recognition signal and the operation of the ignition switch by the matching key starts the engine of the vehicle. If the analyzed signal is not the predetermined recognition signal, either the ignition switch cannot be operated by the key, or, if it can be operated, such operation is ineffective to start the engine.

Portability and/or space limitations usually result in the transmitter/receiver of a TIRIS-type of recognition system being not very powerful. Also, the recognition signals, that is, the signals transmitted or reflected back to the transmitter/receiver from the key-included circuitry, may be derived from the limited energy radiated from the transmitter/receiver, not from energy derived from a key-contained power source, such as a battery, as is typical in systems of the AVI type. While the use of a battery with key-included circuitry of a TIRIS system is technically possible, the large size and resulting unwieldiness of the resulting key would probably lead to rejection by users. As a consequence of the foregoing, it is critical that circuit efficiencies be as high as possible.

One type of recognition circuitry of the subject type includes active and passive components, which in response to the receipt of energy from the transmitter/receiver produce a coded signal. See the above-noted commonly assigned U.S. patents and applications. The coded signal, which may be produced by data stored in memory, is transmitted back to the transmitter/receiver, where comparison with the stored "matching" signal is carried out. The coded signal may be produced by modulating a carrier with the stored code, and the carrier may be, or may be derived from, the energy received by the key-included facilities from the transmitter/receiver. In this latter event, the system may be of the TIRIS variety, and the key and its circuitry require no on-board power source and may be said to be "batteryless." This third type of system may also be of the AVI variety, in which case the transponder is typically powered by a self-contained power source.

Recognition systems of the above type may be the full-duplex variety. Specifically, the transmitter/receiver may simultaneously operate as both a transmitter and a receiver. That is, it may simultaneously radiate energy to the key-included circuitry and receive for analysis the corresponding signal produced by such circuitry. Typically, in full-duplex operation, the frequency of the modulated carrier radiated by the transmitter/receiver to the key-included circuitry is different from the frequency of the modulated carrier produced by the key-included circuitry and thereafter received and analyzed by the receiver/transmitter. See above-noted commonly assigned application Ser. No. 08/021,123 [TI-17529].

The full-duplex (FDX) transponder is continuously powered with RF energy by an interrogator unit and its antenna. The transponder receives the energy by means of a coil.

In operation, the full-duplex transponder receives energy from the interrogator unit via the electromagnetic energy that the interrogator antenna transmits and the transponder coils receive. In responding to the interrogator, the transponder retrieves information that a transponder memory device stores. The transponder modulates the information, using a damping modulation function and associated circuitry by applying a bit stream to a modulation circuit that modulates energy consumption through the transponder coil. For proper transponder operation at both far and near distances, the current from the damping modulation circuit should be as large as possible. At the same time, however, the transponder circuit operation requires at least a minimum amount of power from the received energy to properly operate.

Conventional damping modulation circuits suffer from several limitations. Known damping modulation circuits cannot react properly to fields of different strengths. On the one hand, if the fieldstrength of the transmitter signal is very low, such as in far distance cases, transistors within the damping modulation circuit do not conduct current and the coil voltages become less than the necessary voltage for proper transponder circuit operation. One the other hand, if the fieldstrength is too high, the same transistors are too weak and damping does not occur to a sufficient degree so that a proper modulation index results in the transponder circuit. This problem not only occurs when attempting far and near distance operations, but also if the reactive power in the inductive portions of the transponder circuit is excessively high or if the operating temperature of the transponder circuit, and, in particular, the damping modulation circuit varies significantly.

SUMMARY OF THE INVENTION

There is a need, in light of the above limitations, for a circuit and method of operation that provides damping modulation for a full-duplex transponder of a recognition system including the ability to operate effectively under varying fieldstrength conditions.

There is a further need for a damping modulation circuit for a transponder of a recognition system that provides a maximum current for far distance operation, while leaving a sufficient amount of power for transponder circuit operation.

Still, there is the need for a damping modulation circuit for a transponder of a recognition system that in near distance operation provides the necessary degree to damping modulation for effective transponder operation.

The foregoing disadvantages are eliminated and needs are satisfied by the improved damping modulation circuit of the present invention. The improved damping modulation circuit is used with a transponder of a recognition system that is usable in conjunction with an ignition system or similar control mechanism for a vehicle or other facility.

In accordance with the present invention, a method and system for damping modulation within transponder of a recognition system is provided that associates with a matching member which operates to control a control mechanism of a device. The matching member and other non-matching members contain facilities each of which, when receiving energy transmitted from a transmitter/receiver antenna produce a respective unique recognition signal in the transponder. Control of the device is possible only upon simultaneous occurrence of both operation of the control mechanism and production of a recognition signal by the matching member. The improved damping modulation circuit contains different sub-circuits that perform the current modulation dependent on the fieldstrength conditions and includes a high fieldstrength circuit for protecting the transponder from overvoltage and comprising a plurality of voltage limiters, each of the voltage limiters includes a modulation input for controlling the limiter voltage by conducting current to an electrical ground in a high fieldstrength condition. A low fieldstrength circuit includes a first plurality of transistors that are activated for providing power to operate the remaining portions of the full-duplex transponder. The damping modulation further includes a medium fieldstrength circuit that includes a second plurality of transistors for increasing the fieldstrength for establishing a sufficient amount of current flow for proper modulation of the energy to the full-duplex transponder. The second plurality of transistors in the medium fieldstrength circuit are controlled with respect to the fieldstrength of the voltage at the capacitor-inductor tank.

A technical advantage of the present invention is that it provides a circuit that performs strong modulation to yield a high current loss under high fieldstrength conditions. This mode of operation is useful for near distance operation. The damping circuit performs weak modulation to yield low current loss under a low fieldstrength condition. Long distance operation improves with the present invention at this modulation level. A medium degree of modulation resulting in medium current loss is also possible with the damping modulation circuit of the present invention. Under medium fieldstrength conditions, e.g., with medium distances, this aspect of the invention is attractive.

Another technical advantage of the present invention is that, instead of using only one transistor pair, as in other damping modulation circuits, for the modulation, the damping modification circuit of the present invention uses a combination of transistors to eliminate or substantially reduce "reading holes" in the near distance operation or reduced long distance performance.

Yet, another technical advantage of the present invention is that is provides a damping modulation circuit that achieves proper near, as well as far distance operation by optimally and independently performing the necessary damping modulation function for these different distance conditions. For medium distance, the modulation current adapts to the actual fieldstrength using specialized current control response regulation.

BRIEF DESCRIPTION OF THE DRAWINGS

The invention and its modes of use and advantages are best understood by reference to the following description of illustrative embodiments when read in conjunction with the accompanying generalized, schematic drawings in which like reference numerals indicate like features and wherein:

FIGS. 1a and 1b are generalized depictions of recognition systems that may employ the novel concepts of the present invention.

FIG. 2 illustrates a configuration for a transponder circuit that includes a damping modulation circuit such as that of the present invention and that is useable with the recognition system of FIGS. 1a and 1b.

DETAILED DESCRIPTION OF THE INVENTION

Figure 3:
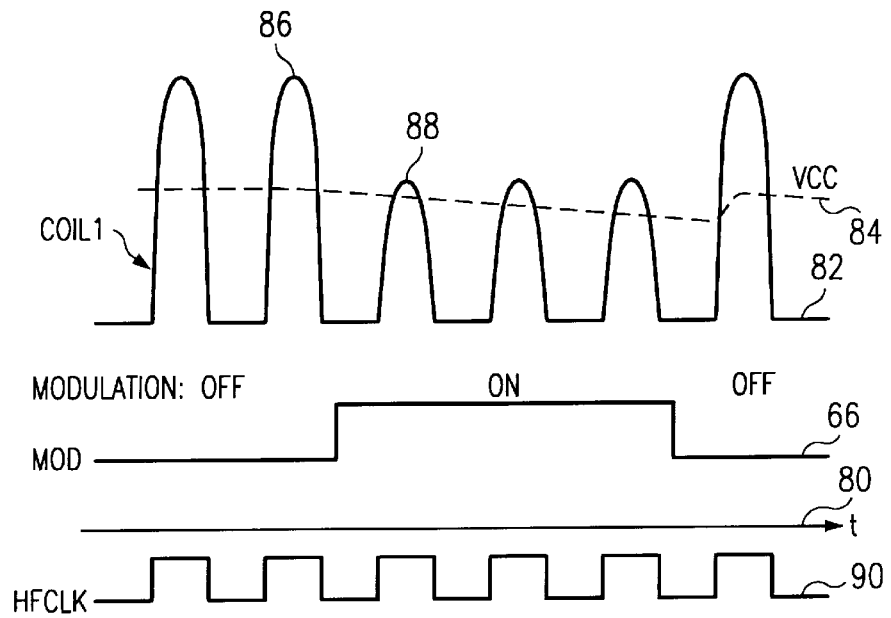
FIG. 3 depicts the different signals that occur throughout the transponder of FIGS. 1a and 1b.

Preferred embodiments of the damping modulation circuit for a full-duplex transponder of the present invention are illustrated in the FIGUREs like numerals being used to refer to like and corresponding parts of the various drawings.

FIGS. 1a and 1b generally illustrate recognition systems 10 that may employ the novel concepts of the present invention. Referring first to FIG. 1a, such systems include transmitter/receiver 12, often called an interrogator or a reader, and transponder 14, sometimes referred to as a tag. Interrogator 12 is a portable or stationary unit which is capable of both transmitting and receiving energy via antenna 16. Transponder 14, which may be self-powered or "batteryless," is capable of receiving energy via an included antenna 18 and, as a consequence thereof, can affect transmitter receiver 12 or transmit energy thereto via antenna 18. Transponder 14 is usually portable and is typically associated with or attached to key-like member 20 which may require identification, counting, routing, sorting or the like.

In typical use, interrogator 12 transmits either continuously or selectively, interrogation signals, in the form of electromagnetic energy, such as radiofrequency (RF) energy, having predetermined characteristics. Selective operation may be initiated manually by a user who perceives the key-like member 20 and who wishes to identify, count, route or sort signals from key-like member 20. Selective operation may also be initiated by key-like member 20 being proximate to or moving past interrogator 12. Transponder 14, which associates with or mounts to key-like member 20 may either "match" or not "match" interrogator 12. If transponder 14 matches, the appropriate key-like member 20 is intended to be identified and counted, routed, sorted, or the like. If transponder 14 does not match, the appropriate key-like member is not intended to be identified, counted, routed, sorted, or the like.

A matching transponder 14 receives the interrogation signal via associated antennas 18 and return a predetermined recognition signal, that is, to either affect interrogator 12 in a predetermined fashion or transmit thereto a signal which is coded in a predetermined manner. A non-matching transponders 14 either does not react at all to the received energy or responds with other than the predetermined recognition signal. The interrogation signal and its related energy that are transmitted by the interrogator 12 and received by the transponder 14 are denoted S1. The recognition signal and its related energy, or the returned signal which produces the recognition signal in response to the interrogation signal S1, are denoted S2.

Systems 10 of the type described in the foregoing paragraphs may be of the TIRIS variety and may include transponder 14 which may be batteryless, that is, may include no on-board power supply. The circuitry of these types of transponders 14 is powered by the energy in the recognition signal S1 received from the interrogator 12 via the antennas 16, 18. In this way transponder 14 may be made extremely small. Indeed, a transponder 14 of the batteryless type may be often subcutaneously implanted in livestock for purposes of later identification or counting.

The transponders 14 of any of the above systems 10 may, at the expense of smallness in size, be powered by an on-board power source. In AVI systems 10 the transponders 14 are carried within vehicles 22. In response to interrogation signal S1 transmitted to a moving vehicle at a selected site, such as a toll booth, such transponders 14 respond with signal S2 which informs interrogator 12 of the identity of vehicle 22. This information is used, in turn, to record the fact that a toll is owed in device 22, with a bill being later sent.

In systems 10 of the AVI type, the signals S1 and S2 need to be relatively strong because of the typical high separation between the interrogator 12 and the transponder 14. In other recognition systems 10, especially those that are batteryless, the signals S1 and S2 are relatively weaker. In either event, it is desirable for transponder 14 to efficiently effect the proper transmission and reception of the signals S1 and S2.

A variation of the above system 10 is illustrated in FIG. 1b, which is similar to the system of FIG. 1a except that the device 22 is associated with a control mechanism 24 and transponder 14 is associated with key-like member 26 for control mechanism 24. In a specific example of this type of system 10, which serves an anti-theft function, the device 22 may be vehicle 28, control mechanism 24 may be an ignition switch which includes a key-operable lock, and key-like member 26 may be a key or other operating member. Transponder 14 may be of the miniature, batteryless variety and is preferably embedded in key-like member 26. The proximity of inductor 18 of transponder 14 in key-like member 26 to antenna 16 of interrogator 12 efficiently couples antennas 16, 18 to permit the above-described transmission and reception of the signals S1 and S2.

FIG. 2 illustrates in further detail the circuitry of full-duplex transponder 14 that may employ the present embodiment and that particularly shows the circuit configuration for damping modulation circuit 40 within transponder circuit 14. In transponder circuit 14 of FIG. 2, COIL 1 connects to antenna 18 and to node 42. COIL 2 also connects to antenna 18, as well as to node 44. $L_R$ antenna 18 receives transmitted energy $S_1$ from $L_A$ antenna 16 of transmitter circuit 12, and transmits energy $S_2$ to $L_A$ antenna 16 of transmitter circuit 12. $C_R$ Capacitor 46 connects between nodes 42 and 44. Zener diodes 48 and 50 isolate lines 52 and 54, respectively, from ground 49. Full-wave rectifier 56 connects between lines 52 and 54 at nodes 58 and 60. From node 62, the voltage $V_{dd}$ from full-wave rectifier 40 appears. Node 63 of full-wave rectifier 56 connects to ground 49. Line 54 provides an input to damping modulation circuit 40. Also, damping modulation circuit 40 receives $V_{dd}$ voltage from node 64, modulation input at line 66, and a COIL 1 input from line 52. Stabilization circuit 68 includes ground 49 connection and $V_{cc}$ output at node 70. $C_r$ capacitor 72 connects between ground 49 and node 70.

FIG. 3 illustrates the signals that occur within transponder circuit 14 for providing the necessary processing and damping modulation operations of the present embodiments. Referring to FIG. 3, there appears time line 80 for establishing a timing reference, t. As time progresses, a voltage signal appears across COIL 1 transmitted signal, as line 82 depicts. Line 84 depicts the V output as occurring at node 70 of transponder circuit 14. Damping modulation signal line 66 corresponds to the modulation input 66 going to damping modulation circuit 40. Line 82 for transmitted signal for COIL 1 includes higher amplitude peaks 86 and lower amplitude peaks 88 that occur in response to the OFF signal value and ON signal value, respectively, of the damping modulation input signal 66. HFCLK signal 90 drives or determines the timing for damping modulation input signal 66.

Figure 4:
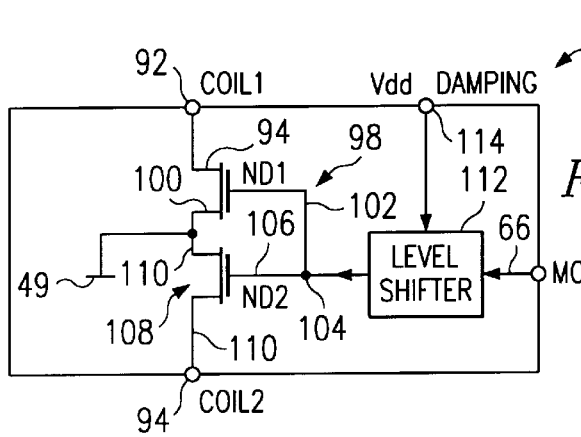
FIG. 4 shows in detail a prior art damping modulation circuit.

FIG. 4 shows damping modulation circuit 40 as of the prior art. Note, however, that damping modulation circuit, here described, and damping modulation circuit 140 of the present invention, perform operations of a similar nature. Damping modulation circuit 40, however, includes all of the limitations and inadequacies heretofore stated. In the prior art, damping modulation circuit 40 of FIG. 4, there is a COIL 1 input at node 92, and a COIL 2 input at node 94. COIL 1 at node 92 to the source 9614 of ND1 transistor 98. Drain 100 of ND1 transistor 98 connects to ground 49. Gate 102 of ND1 transistor 98 connects at node 104 with gate 106 of ND2 transistor 108. Drain 110 of ND2 transistor 108 connects to COIL 2. Level shifter circuit 112 provides a signal to node 104 and receives voltage $V_{DD}$ from node 114 and modulation input 66.

Figure 5:
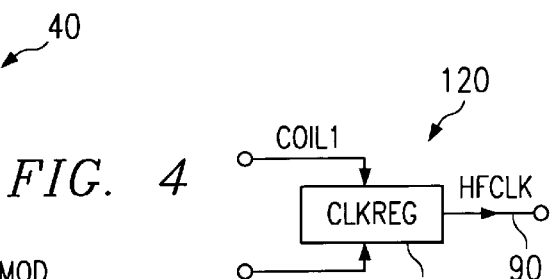
FIG. 5 illustrates a clock regulator circuit for use in controlling the operations of the transponder circuits appearing in FIGS. 1a, 1b and 2.

FIG. 5 shows a block diagram for generating HFCLK signal 90 that is shown in FIG. 3. As FIG. 5 depicts, COIL 1 and COIL 2 provide inputs to clock regulator circuit 122. In response, clock regulator circuit 122 provides HFCLK output 90.

As FIGS. 2 through 5 demonstrate, full-wave rectifier circuit 56 generates pulsed DC voltage $V_{dd}$ which is stabilized by stabilization circuit 68 to produce $V_{cc}$ voltage according to $V_{cc}$ waveform 84 of FIG. 3. The transponder circuit 14 memory (not shown) stores information that $L_R$ antenna 18 transmits back to $L_A$ antenna 16 by damping modulation. This occurs by the generation of a bitstream as in HFCLK bitstream 90 of FIG. 3. The HFCLK Bitstream 90 is applied to a modulation circuit (not shown) to control ND1 transistor 98 and ND2 transistor 108.

For a satisfactory modulation index within transponder circuit 14, it is desirable that the voltage drop of COIL 4 respective to COIL 2 be as large as possible during the ON state of the modulation circuit. On the other hand, the voltage drop cannot be excessive. Otherwise, clock interruption occurs in transponder circuit 14. The prior art damping modulation circuit 40 of FIG. 4 cannot effectively satisfy these demands for all fieldstrength conditions.

To address these limitations, the present embodiment controls ND1 transistor 98 and ND2 transistor 108 by a regulator that builds the difference between COIL 1 and COIL 2 voltages and a third or reference voltage, $V_{REF}$. In the event that the difference between the COIL 1 and COIL 2 voltages is not less than the reference voltage $V_{REF}$, the damping modulation signal is in the ON state to produce a stronger damping modulatiion signal. If the difference between the COIL 1 and COIL 2 voltages is less than the magnitude of the $V_{REF}$ voltage, then the damping modulation signal is in the OFF state to produce a weaker damping modulation signal. In concept, such a damping modulation circuit has effective regulator operation only when the damping modulation waveform is in the ON state or, equivalently, the modulation input signal 66 is high.

Figure 6:
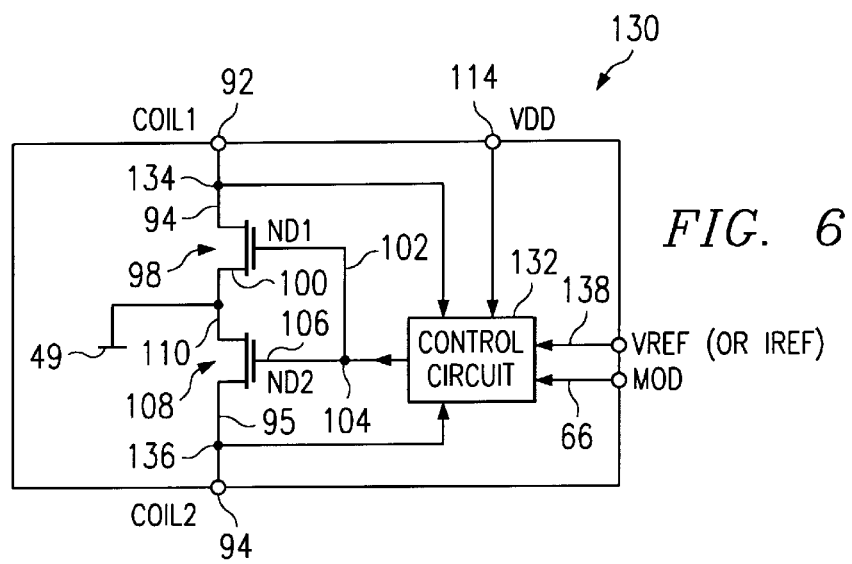
FIG. 6 is a diagram showing the circuit configuration for one embodiment of the present invention.

FIG. 6 to illustrate this concept, shows one embodiment of the present invention as shows damping modulation circuit 130. As FIG. 6 illustrates, COIL 1 provides input to node 92 which supplies source 94 of ND1 transistor 98. ND1 transistor includes source 94, drain 100 and gate 102. Gate 102 connects to node 104, to which gate 106 of ND2 transistor 108 connects. ND2 transistor 108 includes gate 106, source 95 and drain 110. Drain 100 of ND1 transistor 98 and drain 110 of ND2 transistor 108 connect to ground 49. In damping modulation circuit 130, source 94 of ND1 transistor 98 and source 95 of ND2 transistor 108 provide signal inputs to control circuit 132 via respective nodes 134 and 136. Control circuit 132 also receives $V_{dd}$ input from node 114 and modulation input 66. Moreover, $V_{REF}$ (or $I_{REF}$), respectively, indicating a reference voltage and a reference current, goes to control circuit 132 via input 138.

Damping modulation circuit 130 is only one of many possible circuits that satisfy the needs previously identified for the present invention and provides a circuit that controls the damping current and measures current in full-wave rectifier 56 or a voltage or current limiter to obtain a value that reflects the actual fieldstrength reaching transponder circuit 14. In other words, if the fieldstrength is high, control circuit 132 increases the damping current. Conversely, if the fieldstrength is low, control circuit 132 decreases the damping current. But, there are other embodiments that achieve the purposes of the present invention.

Figure 7:
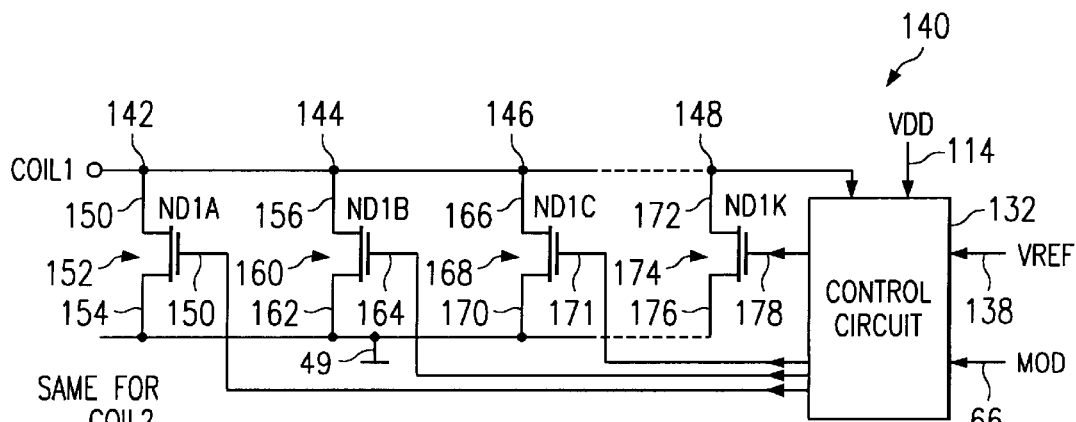
FIG. 7 depicts another embodiment of the present invention formed to accommodate different signal fieldstrength conditions according to the present invention.

FIG. 7, therefore, illustrates an alternative embodiment of the present invention in the configuration of regulator circuit 140. COIL 1 connects to nodes 142, 144, 146, and 148. Node 142 connects to source 150 of ND1A transistor 152, drain 154 of which connects to ground 49. Gate 156 of ND1A transistor 152 receives an input from control circuit 132. Node 144 connects to source 158 of ND1B transistor 160, drain 162 of which connects to ground 49. Gate 164 of ND1B transistor 160 receives an input from control circuit 132. Node 146 connects to source 166 of ND1C transistor 168, drain 170 of which connects to ground 149. Node 148 connects to source 172 of ND1K transistor 174. Drain 176 of ND1K transistor 174 connects to ground 49, and gate 178 receives an input from control circuit 132. Control circuit 132 receives $V_{dd}$ input 114, $V_{REF}$ input 138, and modulation input 66 to control the functions of ND1A transistor 152, ND1B transistor 160, ND1C transistor 168, and ND1K transistor 174. The preferred embodiment also includes a symmetrical circuit for COIL 2, as appears in FIG. 7 for COIL 1.

In alternative embodiment damping modulation circuit 140, ND1 transistor 98 and ND2 transistor 108 of FIG. 6 are "split" into smaller transistors. For example, ND1 transistor 98 may be split into ND1A transistor 152, ND1B transistor 160, ND1C transistor 168, and ND1K transistor 174 (or whatever number desired). In this configuration, if there is a low field strength condition, then only one transistor, e.g., ND1A transistor 152, will be activated. As the fieldstrength increases, ND1B transistor 160, ND1C transistor 168, and so forth may be activated, until all ND1 transistors of damping modulation circuit 140 are activated.

Figure 8:
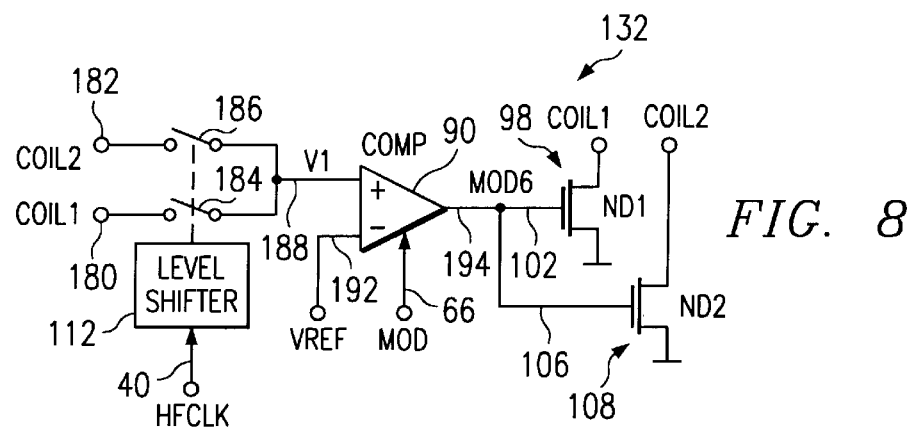
FIG. 8 illustrates one embodiment of a control circuit as referenced in FIG. 6 that may be used with the damping modulation circuit of the present embodiment.

FIG. 8 illustrates one embodiment of control circuit 132 of the present invention. Control circuit 132 receives COIL 2 and COIL 1 inputs from nodes 180 and 132, respectively. Switches 184 and 186 respond to the 182 control by level shifter circuit 112. Level shifter circuit 112 responds to HFCLK signal 90. When switches 184 and 186 close, V1 input travels via line 188 to the "+" terminal of comparator 190. At input 192, comparator 190 receives a $V_{REF}$ input signal. Modulation input 66 also supplies comparator 190, which in response generates MODG output on line 194. The MODG output on line 194 supplies gate 102 of ND1 transistor 98 and gate 106 of ND2 transistor 108 via node 104.

In control circuit 132 of FIG. 8, the MODG signal is defined as the comparator 190 gain, A, times the difference between $V_1$ input and the $V_{REF}$ input, i.e., MODG=A·($V_1$−$V_{REF}$). The modulation input 66 equals zero in a power down state. This makes the modulatiion output MODG signal equal zero. Comparator 190 is enabled by modulation input 66 and will not consume power for the modulation signal value of zero. Comparator 190 turns ND1 transistor 98 and ND2 transistor 108 on when the voltages from COIL 1 or COIL 2 exceed the voltage value, $V_{REF}$. When the clock signal, HFCLK equals 1, control circuit 132 selects to COIL 1. When HFCLK equals 0, control circuit 132 selects to COIL 2. With control circuit 132, it may be desirable, and it is possible, to use as the comparator 190 input voltage V1, the voltage $V_{dd}$. This is because the voltage $V_{dd}$ is the combination of the COIL 1 and COIL 2 voltages of full-wave rectifier 56.

Figure 9:
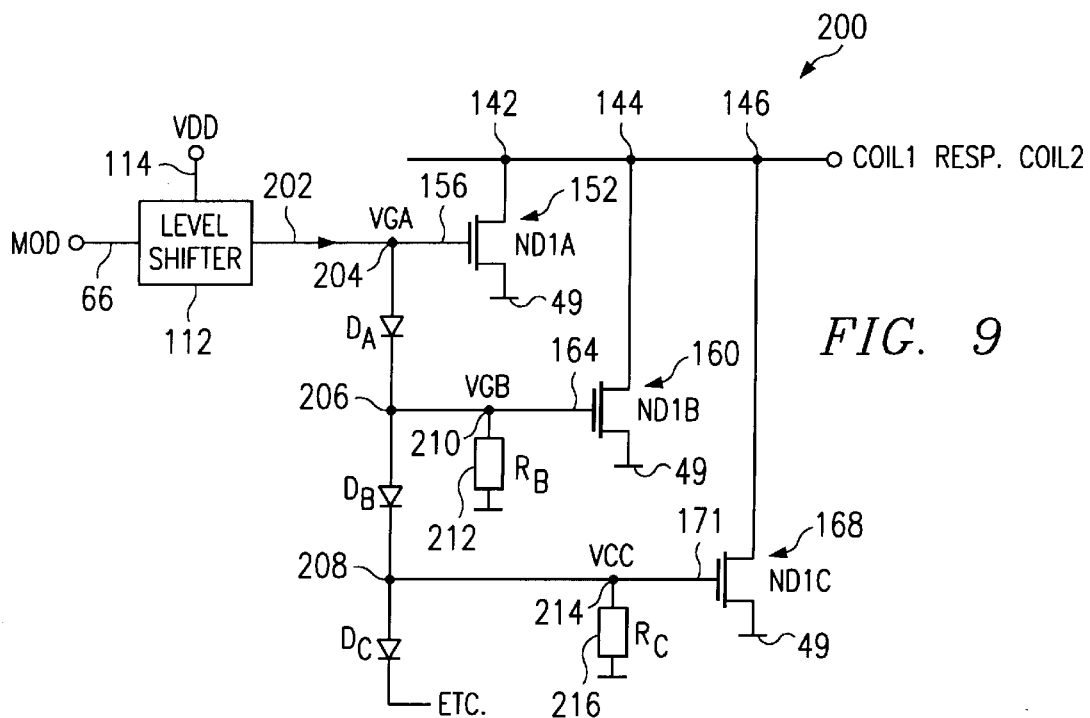
FIG. 9 illustrates yet another embodiment of the control circuit of the present invention.
Figure 10:
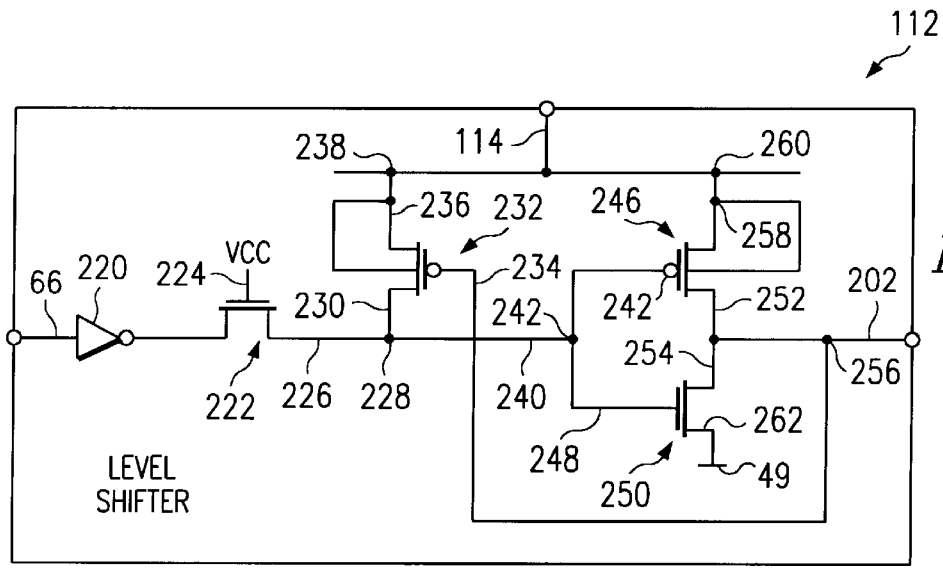
FIG. 10 shows a schematic depiction of a level shifter circuit for use in the control circuit of present invention.

FIG. 9 shows an alternative embodiment control circuit 200 for use with damping modulation circuit 140 of FIG. 7. In alternative embodiment control circuit 200, modulation input 66 goes to level shifter circuit 112. FIG. 10, described below, shows the components of the present embodiment of level shifter circuit 112. Level shifter circuit 112 receives $V_{dd}$ input at line 114 and generates an output on line 202. Diodes DA, DB, and DC feed sequentially from node 204, with node 206 between diodes DA and DB and node 208 between diodes DB and DC. More diode/node connections may be desired according to different numbers of transistors that control circuit 200 is to control. The VGA voltage level at node 204 goes to gate 156 of ND1A transistor 152. The voltage at node 206 goes to node 210 to establish the ND1B transistor 160 voltage VGB at node 210 via $R_B$ resistor 12 that connects to ground 49. The voltage at node 208 goes to node 214 to establish the voltage VGC at gate 171 of ND1C transistor 168.

With alternative embodiment damping modulation circuit 200 of FIG. 9, for a modulation input signal 66 value of 1, gate 156 of ND1A transistor 156 turns on because the VGA voltage level takes a value of approximately $V_{dd}$. Consequently, the voltage $V_{dd}$ drops and a kind of balance occurs such that the current through ND1A transistor 156 rises until the voltage VGA drops to a desired low value. In this condition, if $V_{dd}$ is still sufficiently high, diode DA conducts. This turns on ND1B transistor 160 and, consequently, $V_{dd}$ drops further until a new balanced state occurs. $R_B$ resistor 212 then discharges the voltage VGB for $V_{dd}$ (which has a value less than $V_{GB}+0.7$ V). If the $V_{dd}$ voltage level is still high, diode $D_B$ then may conduct and ND1C transistor 168 then turns on. This process may continue according to the number of ND1K transistors and the value of voltage $V_{dd}$. Note, further, that as opposed to using the diodes, DA through DC, or a similar diode arrangement of damping modulation circuit 200, it may be desirable to use a resistive voltage divider network to generate voltages $V_{GB}$ and $V_{GC}$. In this instance, the numerous ND1 transistors may be source follower transistors with different source resistances.

FIG. 10 provides one embodiment of level shifter circuit 112 of the present embodiment that has use with control circuit 200 of FIG. 9. Level shifter circuit 112 includes modulation input 66 that goes to comparator 220. Comparator 220 provides source current to transistor 222, the gate 224 of which receives the voltage level $V_{cc}$. Drain 226 connects to node 228 which goes to source 230 of transistor 232. Transistor 232 includes gate 234 connection to line 202 that supplies VGA voltage to node 204 of control circuit 200 (FIG. 9). Drain 236 connects to node 238 that is at potential $V_{dd}$. Line 240 from node 228 connects to node 242, which provides a parallel connection to gate 244 of transistor 246 after being inverted, and to gate 248 of tansistor 250. Source 252 of transistor 246 and source 254 of transistor 250 connect in parallel at node 256 to line 202 for providing voltage level VGA. Drain 258 of transistor 246 connects to node 260 to $V_{dd}$ voltage 114. Drain 262 of transistor 250 connects to ground 49.

Figure 11:
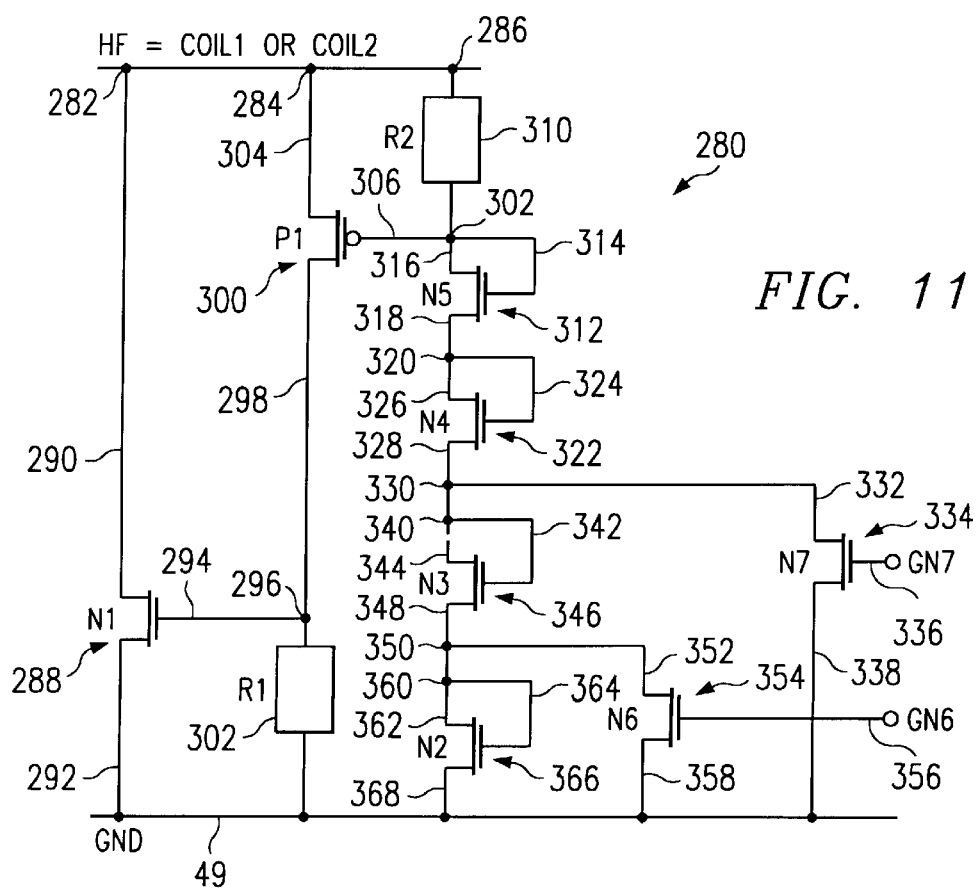
FIG. 11 depicts one embodiment of an RF limiter circuit to support the damping functions of the present invention.

FIG. 11 illustrates yet another alternative embodiment of the present invention as RF limiter circuit 280. RF limiter circuit 28 includes COIL 1 connections at nodes 282, 284 and 286. As with previously described embodiments, only one coil configuration is shown. The coil connection for the other coil, i.e., COIL 2 in this instance, may easily be symmetrical to the described configuration. In RF limiter circuit 280, node 282 connects N1 transistor 288 to COIL 1 at source 290. Drain 292 connects to ground 49, and gate 294 connects at node 296 to drain 298 of P1 transistor 300 and to R1 resistor 302. P1 transistor 300 connects at source 304 to node 284 and at gate 306 to node 308. R2 transistor 310 connects between node 286 and node 308. N5 transistor 312 connects gate 314 and source 316 to node 308 and drain 318 to node 320. N4 transistor 322 connects gate 324 and source 326 to node 320 and drain 328 to node 330. Node 330 also connects to source 332 of N7 transistor 334. Gate 336 of N7 transistor 334 receives a GN7 input signal. Drain 338 of N7 transistor 334 connects to ground 49. Node 340 connects to gate 342 of which connects to node 350. Node 350 also connects to source 352 of N6 transistor 354, the gate 356 receives a GN6 input signal. Drain 358 of N6 transistor 354 connects to ground 49. Node 360 connects to source 362 and gate 364 of N2 transistor 366, the drain 368 of which connects to around 49.

RF-limiter damping modulation circuit 280 supports the damping modulation of the COIL 1 and COIL 2 voltages for transponder circuit 14, but with a different circuit configuration. In RF-limiter damping modulation circuit 280, if the voltage at node 282 is sufficiently high, a current flows through R2 resistor 310 and the chain of transistors, here including, N2 transistor 366, N3 transistor 346, N4 transistor 322, and N5 transistor 312. In turn, P1 transistor 300 turns on to conduct to cause current to flow through R1 resistor 302. With this current N1 transistor 288 conducts to limit the voltage at node 282. N6 transistor 354 shorts N2 transistor 366, if the GN6 input signal equals 1. This causes the RF limiter voltage to drop to a level that is essentially equivalent to the voltage that would exist if N5 transistor 312 were shorted by metal. Likewise, if the GN7 input signal to gate 336 of N7 transistor 334 equals 1, then RF limiter 280 drops even more.

Other alternatives for achieving the inventive concepts of the present invention may include, for example, the complementary use of N-channel and P-channel transistors, the use of bipolar transistors, or other methods to short diodes that are within the ability of a person of ordinary skill in the art. In essence, therefore, the present invention may be considered to include a circuit that operates in a manner similar to that of a voltage-controlled Zener diode.

In summary, the present invention provides a damping modulation circuit for a full-duplex transponder that associates with a matching member to control a control mechanism of a device. The matching member and other non-matching members contain facilities each of which, when receiving energy transmitted from a transmitter/receiver an antenna produce a respective unique recognition signal in the transponder. Control of the device is made possible only upon simultaneous occurrence of both operation of the control mechanism and production of a recognition signal by the matching member; wherein the improved damping modulation circuit includes a high fieldstrength circuit a first set of circuit elements for providing power to and for protecting the full-duplex transponder from over voltage in a high fieldstrength condition. A low fieldstrength circuit includes a second plurality of circuit elements for providing power and modulation in part to the full-duplex transponder in a low fieldstrength condition; and a medium fieldstrength circuit comprising a third plurality of circuit elements for providing power and modulation input to the full-duplex transponder in a medium fieldstrength condition.

Although the invention has been described in detail herein with reference to the illustrative embodiments, it is to be understood that this description is by way of example only and is not to be construed in a limiting sense. It should be understood that various changes, substitutions and alterations may be made herein without departing from the spirit and scope of the invention as defined in the dependent claims.

What is claimed is:

1. A damping modulation circuit within a transponder, wherein the transponder comprises a circuit having a fieldstrength voltage in dependence upon the transponder's proximity to an interrogator wherein the damping modulation circuit comprises:
   a high fieldstrength circuit comprising a plurality of voltage limiters, each of said voltage limiters comprising a modulation input for controlling the limiter voltage by conducting a large portion of transponder current to an electrical ground in response to said transponder circuit having a high fieldstrength voltage;
   a low fieldstrength circuit comprising a first plurality of transistors for conducting a small portion of transponder current to ground while leaving the remaining portion of transponder current for providing power for operating said transponder in response to said transponder circuit having a low fieldstrength voltage; and
   a medium fieldstrength circuit comprising a second plurality of transistors, said second plurality of transistors activated to establish a sufficient amount of current flow for a desired degree of modulation of energy within said transponder and in response to said transponder circuit having a medium fieldstrength voltage.

2. The damping modulation circuit according to claim 1 wherein said high fieldstrength circuit comprises a plurality of transistors and wherein said a majority of said plurality of transistors is turned on in response to said transponder circuit having a high fieldstrength voltage.

3. The damping modulation circuit according to claim 1, wherein said low fieldstrength circuit comprises a plurality of transistors and wherein only a smallest subset of said plurality of transistors turns on in response to said transponder circuit having a low fieldstrength voltage.

4. The damping modulation circuit according to claim 1, wherein said medium fieldstrength circuit comprises a plurality of transistors and wherein less than a majority of said plurality of transistors turns on in response to said transponder circuit having a medium fieldstrength voltage.

5. The damping modulation circuit according to claim 1, wherein said high fieldstrength circuit comprises a plurality of transistors and a plurality of associated diodes for limiting the operation of said transistors in response to the fieldstrength received by said transponder circuit.

6. The damping modulation circuit according to claim 1 wherein said transponder is associated with a matching member which operates to control a control mechanism of a device.

7. The damping modulation circuit according to claim 6 wherein said matching member and other non-matching members, upon receiving energy from a transmitter/receiver antenna, produce a respective unique recognition signal in response thereto.

8. The damping modulation circuit according to claim 6, wherein control of said device occurs in response to operation of said control mechanism and production of a recognition signal by said matching member.

9. The damping modulation circuit according to claim 1 wherein said voltage limiters are zener-diodes.

10. The damping modulation circuit according to claim 1 wherein said voltage limiters are connected in parallel with modulation circuitry.

11. The method of forming a damping modulation circuit according to claim 1, wherein said high fieldstrength circuit comprises a plurality of transistors and a plurality of associated diodes for limiting the operation of said transistors in response to the fieldstrength voltage received by said transponder circuit.

12. A method of forming a damping modulation circuit for a transponder, wherein the transponder comprises a circuit having a fieldstrength voltage in dependence upon the transponder's proximity to an interrogator comprising:
   forming a high fieldstrength circuit comprising a plurality of voltage limiters, each of said voltage limiters comprising a modulation input for controlling the limiter voltage by conducting current to an electrical ground in response to said transponder circuit having a high fieldstrength voltage;
   forming a low fieldstrength circuit comprising a first plurality of transistors for conducting a small portion of transponder current to ground while leaving the remaining portion of transponder current for providing power for operating said transponder in response to said transponder circuit having a low fieldstrength voltage;
   forming a medium fieldstrength circuit comprising a second plurality of transistors for establishing a sufficient amount of current flow for a desired degree of modulation of energy within said transponder and in response to said transponder circuit having a medium fieldstrength voltage.

13. The method of forming a damping modulation circuit according to claim 12 wherein said transponder is associated with a matching member which operates to control a control mechanism of a device.

14. The method of forming a damping modulation circuit according to claim 13 wherein said matching member and other non-matching members, upon receiving energy from a transmitter/receiver antenna, produce a respective unique recognition signal in response thereto.

15. The method of forming a damping modulation circuit according to claim 14, wherein control of said device occurs in response to operation of said control mechanism and production of a recognition signal by said matching member.

16. The method of forming a damping modulation circuit according to claim 12 wherein said voltage limiters are zener-diodes.

17. The method of forming a damping modulation circuit according to claim 12 wherein said voltage limiters are connected in parallel with modulation circuitry.

18. The method of forming a damping modulation circuit according to claim 12 wherein said high fieldstrength circuit comprises a plurality of transistors and wherein said a majority of said plurality of transistors is turned on in response to said transponder circuit having a high fieldstrength voltage.

19. The method of forming a damping modulation circuit according to claim 12 wherein said low fieldstrength circuit comprises a plurality of transistors and wherein only a smallest subset of said plurality of transistors turns on in response to said transponder circuit having a low fieldstrength voltage.

20. The method of forming a damping modulation circuit according to claim 12 wherein said medium fieldstrength circuit comprises a plurality of transistors and wherein less than a majority of said plurality of transistors turns on in response to said transponder circuit having a medium fieldstrength voltage.

* * * * *